(12) United States Patent
Muthusrinivasan et al.

(10) Patent No.: US 8,099,480 B1
(45) Date of Patent: Jan. 17, 2012

(54) SCALABLE WORKFLOW DESIGN FOR AUTOMATED SERVICE MANAGEMENT

(75) Inventors: Muthuprasanna Muthusrinivasan, Mountain View, CA (US); Balaji Venkatachari, Cupertino, CA (US)

(73) Assignee: Google Inc., Mountain View, CA (US)

( * ) Notice: Subject to any disclaimer, the term of this patent is extended or adjusted under 35 U.S.C. 154(b) by 287 days.

(21) Appl. No.: 12/323,171

(22) Filed: Nov. 25, 2008

(51) Int. Cl.
*G06F 15/16* (2006.01)

(52) U.S. Cl. .......... 709/222; 709/201; 709/223; 706/45

(58) Field of Classification Search .................. 709/201, 709/222, 223
See application file for complete search history.

(56) References Cited

U.S. PATENT DOCUMENTS

| | | | |
|---|---|---|---|
| 5,617,510 A * | 4/1997 | Keyrouz et al. ................ | 706/45 |
| 5,642,508 A | 6/1997 | Miyazawa | |
| 6,874,008 B1 * | 3/2005 | Eason et al. ................ | 709/201 |
| 6,986,145 B2 | 1/2006 | Gangopadhyay | |
| 7,185,342 B1 | 2/2007 | Carrer et al. | |
| 2003/0144860 A1 * | 7/2003 | Casati et al. ................ | 705/1 |
| 2004/0177245 A1 * | 9/2004 | Murphy ................ | 713/100 |
| 2005/0256882 A1 | 11/2005 | Able et al. | |
| 2006/0074733 A1 * | 4/2006 | Shukla et al. ................ | 705/8 |
| 2006/0143031 A1 | 6/2006 | Bou-Ghannam et al. | |
| 2007/0021995 A1 | 1/2007 | Toklu et al. | |
| 2007/0044067 A1 | 2/2007 | Feldman | |
| 2007/0093916 A1 | 4/2007 | Sanghvi et al. | |
| 2007/0168349 A1 | 7/2007 | Sanghvi et al. | |
| 2007/0288275 A1 | 12/2007 | Kumar | |
| 2008/0049614 A1 | 2/2008 | Briscoe et al. | |
| 2008/0059501 A1 | 3/2008 | Roller | |
| 2008/0104217 A1 * | 5/2008 | Srinivasa et al. ............ | 709/223 |
| 2008/0189278 A1 | 8/2008 | Akkiraju et al. | |
| 2008/0201715 A1 | 8/2008 | Breiter et al. | |
| 2008/0243901 A1 | 10/2008 | Super et al. | |
| 2008/0243993 A1 | 10/2008 | Wang et al. | |
| 2008/0244606 A1 * | 10/2008 | Wylie et al. ................ | 718/104 |
| 2009/0067719 A1 * | 3/2009 | Sridhar et al. ................ | 382/176 |
| 2009/0113394 A1 * | 4/2009 | Weber et al. ................ | 717/126 |
| 2009/0144720 A1 * | 6/2009 | Roush et al. ................ | 717/171 |
| 2009/0165002 A1 * | 6/2009 | Sterbenz ................ | 718/102 |

OTHER PUBLICATIONS

Busatto et al., Definition of an Encapsulated Hierarchical Graph Data Model Static Aspects, Part 1, Technischer Bericht 96-38, Vakgroep Informatica, Rijksuniversiteit Leiden, Dec. 1996, 28 pages.

Kubicek et al., Dynamic Allocation of Server to Jobs in a Grid Hosting Environment, BT Technology Journal, vol. 22. No. 3, Jul. 2004, pp. 251-260.

Chandra et al., Quantifying the Benefits of Resource Multiplexing in On-Demand Data Centers, Proceedings of First ACM Workshop on Algorithms and Architecture for Self-Managing Systems, Jun. 2003, 6 pages.

Distributed Make (dmake) [online]. Sun Microsystems, Inc., 2004 [retrieved on Nov. 13, 2008]. Retrieved from the Internet: <URL: http://docs.sun.com/source/819-0506/dmake.html>.

* cited by examiner

*Primary Examiner* — Wing Chan
*Assistant Examiner* — Tesfay Yohannes
(74) *Attorney, Agent, or Firm* — Brake Hughes Bellermann LLP

(57) ABSTRACT

A system may include a node repository that is configured and arranged to store one or more nodes, where each of the nodes represents an encapsulated workflow and each of the nodes includes a set of interfaces that are configured to enable interactions between the nodes, a configuration repository that is configured and arranged to store one or more configuration files, where each of the configuration files specifies a configuration for execution of one or more of the nodes and an execution engine that is arranged and configured to construct a dependency graph of nodes as specified in at least one of the configuration files and to execute the dependency graph.

19 Claims, 3 Drawing Sheets

SCALABLE WORKFLOW DESIGN FOR AUTOMATED SERVICE MANAGEMENT

TECHNICAL FIELD

This description relates to scalable workflow design for automated service management.

BACKGROUND

Many businesses and organizations encounter complex tasks and workflow processes on a regular and repeat basis, where the tasks and processes may not be coordinated in any automated manner. For example, many businesses and organizations are challenged on a regular and repeat basis to meet service demands with appropriate resources. To meet service demands, the resources may need to be changed such as, for example, by adding new resources or reallocating existing resources. The reallocation of existing resources may be an extremely tedious, time consuming process and expensive process. Similarly, the addition of new resources may have its own financial burdens and constraints.

For instance, an online service provider may be challenged on a regular and repeat basis to meet user traffic demand for various online and backend resources. To meet the user traffic demand, the online service provider may over-allocate certain resources instead of adding new resources or re-allocating existing resources to avoid the costs and burdens currently associated with those options. However, the over-allocation of the resources may result in a subsequent under-utilization of these resources. Consequently, this option may not be cost efficient, especially over a longer period of time.

Hence, there's a greater need to be agile and have an automated process flow in place to react to the changing needs quickly.

SUMMARY

The process flows, which also may be referred to as workflows, may be modeled as a graph of interdependent nodes each representing an atomic task to be accomplished or other workflows themselves. According to one general aspect, a system may include a node repository that is configured and arranged to store one or more nodes, where each of the nodes represents an encapsulated workflow. The nodes include a set of interfaces that are configured to enable interactions between the nodes. The system also includes a configuration repository that is configured and arranged to store one or more configuration files, where each of the configuration files specifies a configuration for execution of one or more of the nodes and an execution engine that is arranged and configured to construct a dependency graph of nodes as specified in at least one of the configuration files and to execute the dependency graph.

Implementations may include one or more of the following features. For example, the encapsulated workflow may include a single action, a group of actions that define a single resource, a group of resources that define a single service, and/or a group of services that define a single workflow. The set of interfaces may include a configuration interface that is arranged and configured to enable inter-level communications, an authorization interface that is arranged and configured to verify user permissions for interaction with the node, an import interface that is arranged and configured to receive runtime data from other nodes, and an export interface that is arranged and configured to provide runtime data to the other nodes.

The execution engine is arranged and configured to execute the dependency graph in response to one or more trigger events.

In one exemplary implementation, each of the nodes may define a self-contained sub-graph of a dependency graph of a portion of a process for moving an online service from a first cluster to a second cluster, where the nodes are defined by one or more different teams and include processes and related dependencies for setup of the online service at the second cluster and teardown of the online service at the first cluster. At least one of the configuration files may include a service definition for the process and defines an execution order of the nodes at each level for the process for moving the online service from the first cluster to the second cluster. The execution engine may be arranged and configured to construct the dependency graph for the process for moving the online service from the first cluster to the second cluster and to execute the dependency graph. The execution engine may be arranged and configured to automatically trigger the process for moving the online service from the first cluster to the second cluster in response to one or more external events. Each of the nodes may be independently modifiable and independently reusable in other processes for moving other online services from one cluster to another cluster.

In one exemplary implementation, one or more of the nodes may represent one or more encapsulated workflow processes related to moving a service from a first cluster to a second cluster, at least one of the configuration files specifies a configuration related to moving the service from the first cluster to the second cluster and the execution engine is arranged and configured to construct the dependency graph of nodes related to moving the service from the first cluster to the second cluster and to execute the dependency graph.

In another general aspect, a method may include storing one or more nodes, where each of the nodes represents an encapsulated workflow and each of the nodes includes a set of interfaces that are configured to enable interactions between the nodes, storing one or more configuration files, where each of the configuration files specifies a configuration for execution of one or more of the nodes, constructing a dependency graph of nodes as specified in at least one of the configuration files, and executing the dependency graph to cause the encapsulated workflows represented by each of the nodes in the constructed dependency graph to be processed as an integrated workflow process.

Implementations may include one or more of the features discussed above.

In another general aspect, a computer program product for executing a workflow may be tangibly embodied on a computer-readable medium and include executable code that, when executed, is configured to cause a data processing apparatus to store one or more nodes in a node repository, where each of the nodes represents an encapsulated workflow and each of the nodes includes a set of interfaces that are configured to enable interactions between the nodes, store one or more configuration files in a configuration repository, where each of the configuration files specifies a configuration for execution of one or more of the nodes and to cause an execution engine to construct a dependency graph of nodes as specified in at least one of the configuration files and to execute the dependency graph, where the encapsulated workflows represented by each of the nodes in the constructed dependency graph are processed as an integrated workflow process.

Implementations may include one or more of the features discussed above.

The details of one or more implementations are set forth in the accompanying drawings and the description below. Other features will be apparent from the description and drawings, and from the claims.

DETAILED DESCRIPTION

Figure 1:
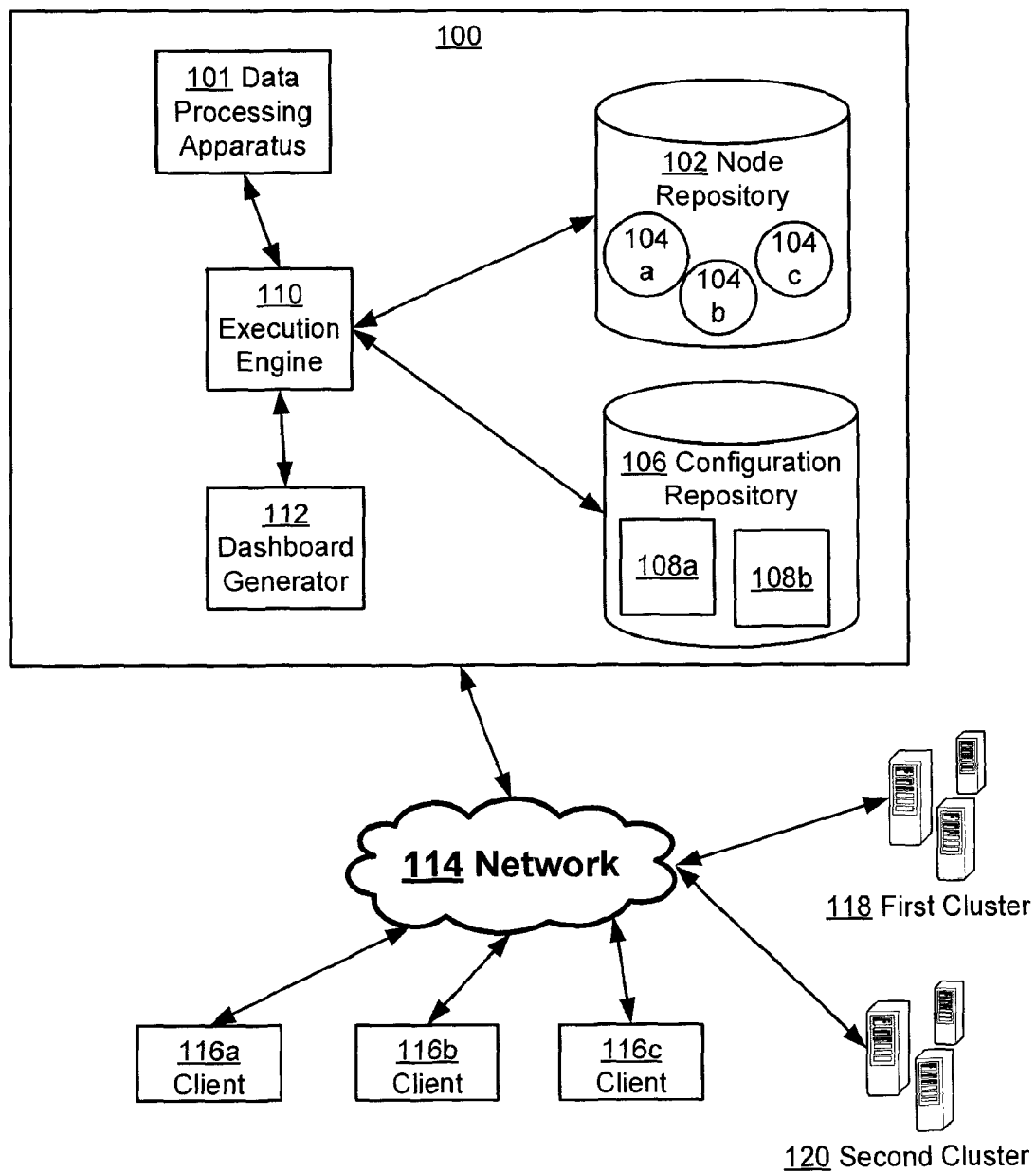
FIG. 1 is an exemplary block diagram of a system for automating workflows.

In general, a system, a method and/or a computer program produce may be implemented to construct a dependency graph of one or more nodes using a configuration file, where each of the nodes represents an encapsulated workflow. The dependency graph may be executed, which results in the execution of the encapsulated workflows that are represented by each of the nodes. The system, method and/or computer program product support an encapsulated hierarchical design that enables multiple entities to coordinate in a scalable and distributed manner to perform a successful workflow execution. The nodes may be stored in a node repository that is accessible to multiple entities such that the nodes may be reused in many different dependency graphs and in different combinations and configurations.

The system, method and/or computer program product may be used to perform many different types of workflow executions related to many different processes. In one exemplary implementation, the system, method and/or computer program may be used to automate a service management system for moving services (e.g., online services) from one resource (e.g., cluster) to another resource. For instance, multiple different entities may be involved and play a role in moving a service from one resource to another resource. Each of the entities may define and capture their portion of the process in one or more nodes as encapsulated workflows and store the nodes in a node repository. The nodes may include dependencies or preconditions that may need to be satisfied in order for a node to begin and/or complete its execution. In this manner, the process is distributed with each of the entities, who are responsible for a specific portion of the process, storing their process information in one or more nodes in a central repository that is accessible by multiple entities. An entity responsible for moving a service from one resource to another resource may generate a configuration file, where the configuration file specifies a configuration for the execution of the one or more nodes. An execution engine may construct a dependency graph of nodes needed to perform the service move, where the dependency graph ensures that there is an execution order for the nodes at each level in the graph. The execution engine may execute the nodes taking into account the execution order and the various dependencies associated with each of the nodes.

In this manner, service moves may be automated with the execution engine automatically executing the encapsulated workflows as represented by each of the nodes taking into account the order in which processes need to be performed, as well as their preconditions, to ensure a successful move of the services from one resource to another resource. The schema provides for an encapsulated hierarchical design that permits multiple coordinating entities (e.g., multiple teams) to define, maintain and execute different pieces, in the form of nodes, of the entire service management process independent of each other. The different pieces may be executed in a coordinated and ordered fashion to enable a more seamless and automated transfer of services from one resource to another resource.

FIG. 1 is a block diagram of a system 100 for automating workflows. The system 100 includes a data processing apparatus 101, a node repository 102 that is configured and arranged to store multiple nodes 104a-104c, a configuration repository that is arranged and configured to store multiple configuration files 108a-108b, an execution engine 110, and a dashboard generator 112. The system 100 may be implemented in hardware, software, or a combination of hardware and software. For example, the system 100 may be a computing device such as, for instance, a server, a personal computer, a workstation, a laptop computer, or any type of computing device.

The data processing apparatus 101 may be configured to process data and to execute executable code which, when executed, causes the data processing apparatus 101 to perform in a certain manner. The data processing apparatus 101 may include one or more processors suitable for the execution of a computer program product having executable code including, by way of example, both general and special purpose microprocessors, and any one or more processors of any kind of digital computer. The data processing apparatus 101 may be configured to communicate with any of the components of the system 100.

The system 100 may be accessible through network 114. The network 114 may include any type of wired and/or wireless network including, for example, a local area network (LAN), a wide area network (WAN), the Internet or a combination of these networks. One or more clients 116a-116c may access the system 100 through the network 114. The clients 116a-116c may include any type of computing device such as for example, a personal computer, a workstation, a server, a laptop computer, a personal digital assistant (PDA), or any other type of computing device.

The node repository 102 may be arranged and configured to store one or more nodes 104a-104c. Although three nodes 104a-104c are illustrated, the node repository may store many different nodes. The node repository 102 is a shared repository of nodes 104a-104c that may be accessible through the network 114 by the clients 116a-116c. The clients 116a-116c may define and update the nodes 104a-104c.

Each of the nodes 104a-104c may represent an encapsulated workflow. For example, the encapsulated workflow may be a single action, a single resource (e.g., a group of actions), a single service (e.g., a group of resources) or a single workflow (e.g., a group of services). In this manner, the nodes 104a-104c may represent both an encapsulated and a hierarchical structure.

Figure 2:
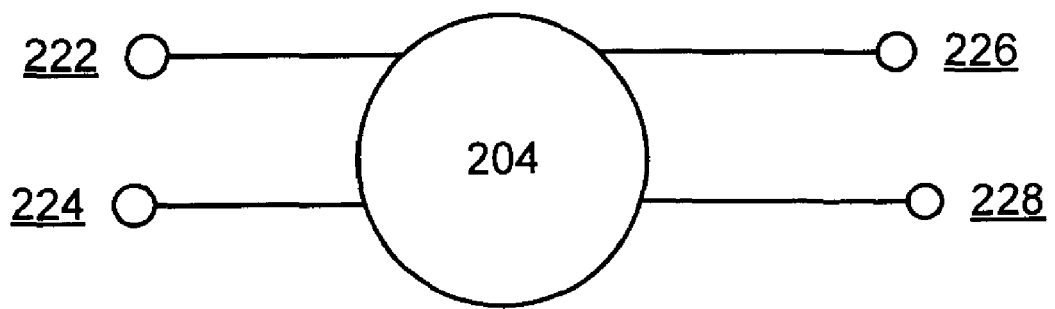
FIG. 2 is an exemplary block diagram of an exemplary node including a set of interfaces.

Each of the nodes 104a-104c also may include a set of interfaces that are configured to enable interactions among the nodes 104a-104c and between the nodes 104a-104c and users such as users on clients 116a-116c or users directly on system 100. Referring to FIG. 2, an exemplary block diagram of a node 204 having a set of interfaces 222-228 is illustrated. The interfaces may include a configuration interface 222, an authorization interface 224, and import interface 226 and an export interface 228. The configuration interface 222 may be used for inter-level communications such as adjacent level communications between nodes. The configuration interface 222 may enable the node 204 to accept input parameters from a client for appropriate configuration and execution of the node 204. In one exemplary implementation, the configuration interface 222 may be configured to accept static input parameters from a client, where the static input parameters may be used in the configuration and execution of the node 204.

The authorization interface 224 may be configured to verify current user permissions with the expected authorizations for the execution of the node 204. The authorization interface 224 also may be configured to choose to invoke execution scripts for the node 204, file an external ticket (e.g., either a manual or an automated ticket) with the authorized user or users, and report any errors relating to the configuration and/or execution of the node 204.

The import interface 226 may be configured to accept dynamic runtime data from other nodes in a dependency graph. For example, node 204 may receive data from other nodes using through the import interface 226. The export interface 228 may be configured to enable the node 204 to provide data to other nodes.

Configuration and other data within the node 204 may be private to the node 204 meaning that other nodes may not access the data within the node 204. The combination of the configuration interface 222 and the import interface 226/export interface 228 enable communication between nodes.

As one exemplary implementation, a specific example of a node 204 is provided. For instance, the node 204 may be configured to perform the action of creating a new file. The configuration interface 222 may be optionally configured to accept parameters such as, for example, file name, permissions, data, and other parameters. The import interface 226 may be optionally configured to accept parameters such as, for example, replication type and compression style from other nodes in the system. The export interface 228 may be optionally configured to provide other nodes with parameters such as, for example, checksum value, file size and other parameters. The authorization interface 224 may be configured to allow only engineers with a specific code or identification to create files. The node 204 may be stored in a node repository (e.g., node repository 102 of FIG. 1). The node 204 may be made available to clients configuring a workflow process that calls for the action of creating a new file.

Each node 204 may represent a fully self-contained sub-graph that includes a single root node and multiple other internal nodes inter-connected using inward and outward links in the form of the set of interfaces 222-228. Thus, each node 204 may define its dependencies on other nodes (e.g., other actions or groups of action) and on particular resources. The internal nodes may not have any external links to nodes at higher hierarchical levels, which may be true for the different levels inside the sub-graph, and only the root node at any hierarchical level may be permitted to do so.

Referring back to FIG. 1, the configuration repository 106 may be arranged and configured to store one or more configuration files 108a-108b. Although only two configuration files 108a-108b are illustrated, the configuration repository 106 may be configured to store many multiple different configuration files. Each of the configuration files 108a-108b may specify a configuration for execution of one or more of the nodes 104a-104c. The configuration files 108a-108b may define configuration parameters that may be used to execute a particular workflow comprised on one or more nodes 104a-104c. The configuration files 108a-108b may specify a particular process for a specific workflow including the nodes 104a-104c to use from the node repository 102, the node dependencies and the order of executing the nodes 104a-104c for the specific workflow. Once a configuration file has been generated, the configuration file may be saved in the configuration repository for use now and for future uses.

In one exemplary implementation, the clients 116a-116c may define a configuration file 108a-108b for performing a particular process using the nodes 104a-104c that have been independently defined and stored in the node repository 102. For instance, one of the clients 116a-116b may be responsible for moving resources from a first cluster 118 to a second cluster 120. The first cluster 118 and the second cluster 120 may be one or more servers such as, for example, web servers, that are configured to provide online services (e.g., online search services, email services, online shopping services, etc.) to end users. One or more services may need to be moved from the first cluster 118 to the second cluster 120. One of the clients 116a-116c may define a configuration file to specify the workflow of nodes that to be followed for performing the move from the first cluster 118 to the second cluster 120. The configuration file may be authored using a text editor. The configuration file may include one or more nodes and the order in which those nodes may need to be executed.

The execution engine 110 may be configured to construct a dependency graph of nodes as specified by a configuration file and executes the dependency graph. In this manner, when the configuration file is ready for execution, the execution engine 110 may access the file from the configuration repository 106 and construct a dependency graph using the nodes and the order of execution of the nodes as defined in the configuration file. In one exemplary implementation, the dependency graph may include a directed acyclic graph (DAG) of dependencies or preconditions. The execution engine 110 may provide a visual representation of the dependency graph for access and viewing by one of the clients 116a-116c. The execution engine 110 provides for an ordered execution of the workflow as defined by the configuration file. The execution engine 110 is configured to guarantee dependency correctness between the nodes to provide for an automated workflow solution. In one exemplary implementation, a node can start executing only if all the nodes on its outward directed edges at that level have successfully completed their execution. The acyclic nature of the dependency graph may ensure that there is a strict execution order for all the nodes at every level in the graph.

The execution engine 110 may be configured to exit the workflow when no more dependencies can be satisfied and provide an indication that the workflow has been exited and/or stopped. The execution engine 110 may be configured to perform multiple iterations over a single dependency graph. For example, if the execution engine 110 cannot complete a dependency graph due to a blocker (e.g., a bug, a dependency that cannot be satisfied, etc.), then the execution engine 110 can attempt to continue execution or re-execute that dependency graph at a later time. Multiple instances of the execution engine 110 may be instantiated such that multiple workflows are being executed simultaneously.

The execution engine 110 may be configured to execute the outward links of a node at a certain level in parallel. Thus, sequential blocking execution may be implemented by chaining nodes in a linear structure, as defined in a configuration file.

A check-build-check paradigm may be used by the execution engine 110 in the execution of nodes. A first check stage may verify if the task had already been completed. If not, the build stage may perform the actual work, and the final check stage may verify that the build stage actually completed the intended work.

The following is an exemplary implementation of a scalable workflow using system 100. For instance, it may be that the second cluster 120 is a new cluster to which one or more services will be moved. One of the nodes may be defined as the second cluster is operational upon quality assurance (QA) approval [Cluster is operational→QA approval].

Members of the QA team may define a workflow graph in a separate node for its processes, which may be executed in parallel: [QA approved→Machines okay, Network okay, Power okay, Water okay, Techs okay]. This node, along with the other nodes, may be stored in the node repository 102.

The energy negotiation team may define one or more workflow graphs in separate nodes for its processes: [Power okay→Negotiate with City] and [Water okay→Verify]. The machines team then defines its own workflow graph in a separate node: [Machines okay→Software Install→Buy Machines→Purchase order team request]. The network team defines its own workflow graph in a separate node: [Network okay→Fiber install→Buy bandwidth→Purchase order team request]. The hiring team defines it own workflow graph in a separate node: [Techs okay→Train techs→Hire techs].

A configuration file may be defined as: [Cluster is operational: [Configuration Interface: region=Asia, size=big, budget=$100M]]. A new instance of the execution engine 110 may be instantiated and the configuration file may be executed. The execution engine 110 may construct a dependency graph of the overall workflow process and begin execution of the dependency graph.

The automated script for the node defined by the QA team looks at the input data and appropriately delegates specific configuration parameters to different 'okay' steps such as, for example, machines=$1M, network=1TeraByte, and power=2 mega watts. The various configuration parameters for automated scripts of the different teams are then delegated and invoked in turn. For instance, if a management team doesn't have direct authorization for 'buy' machines/resources, explicit tickets may be opened automatically with the default personnel on the teams designated to perform those independently. The execution engine 110 may be configured to periodically poll to check to see if these tasks have been completed so that the processes may continue. The execution engine 110 continues executing the nodes until the second cluster 120 is up and running.

In one exemplary implementation, the various teams may make a change to one of their processes, thus managing their separate, independent process workflows. For instance, the machines team may alter their workflow process to: [Machines okay→Software Install→Setup Virtualization→Buy Machines→Purchase order team request]. When this node is invoked by a configuration file and executed by the execution engine 110, the altered process will now be performed. The process is altered without impact on the other teams.

In one exemplary implementation, the execution engine 110 may be configured to execute a dependency graph in response to one or more trigger events. For instance, one or more triggers may be setup that can trigger the execution of any workflow based on one or more external and/or internal constraints that have been met. For example, a trigger may be set to execute a move of services from the first cluster 118 to the second cluster 120 when certain overload parameters are met on the first cluster 118.

System 100 also may include a dashboard generator 112. The dashboard generator 112 may be configured to provide a consolidated display of the various instances of the execution engine 110 and the status of the execution of the workflow processes. The dashboard generator 112 also may be configured to other information such as, for example, start and finish times, current status, description, actions being performed, point of contact, and other information.

Using system 100, any type of workflow process may be set up and executed. For instance, in an organizational setting, different teams having different areas of responsibilities may define nodes for their respective processes and store the nodes in the node repository 102, which may be accessible to the different teams. Different nodes may be defined to reflect variations in processes depending on particular circumstances. The variations in nodes may be reflected in variations to the set of interfaces such as, for example, the import and export interfaces. Any of the clients 116a-116c may choose any of the nodes from the node repository 102 to define their own custom interfaces and implementations, and build on them iteratively. Thus, a large number of nodes may be created and stored in the node repository 102.

When a specific instances is to be executed, a configuration file may be defined or selected from an existing configuration file stored in the configuration repository 106. Specific parameters may be defined in the configuration file including which nodes may need to be executed as well as their order. The execution engine 110 may be invoked to execute the configuration file in an automated manner.

The system 100 may provide scalability, full user control, distributed control and management, and the ability to create independent processes (i.e., nodes) that reflect variations and changes.

Figure 3:
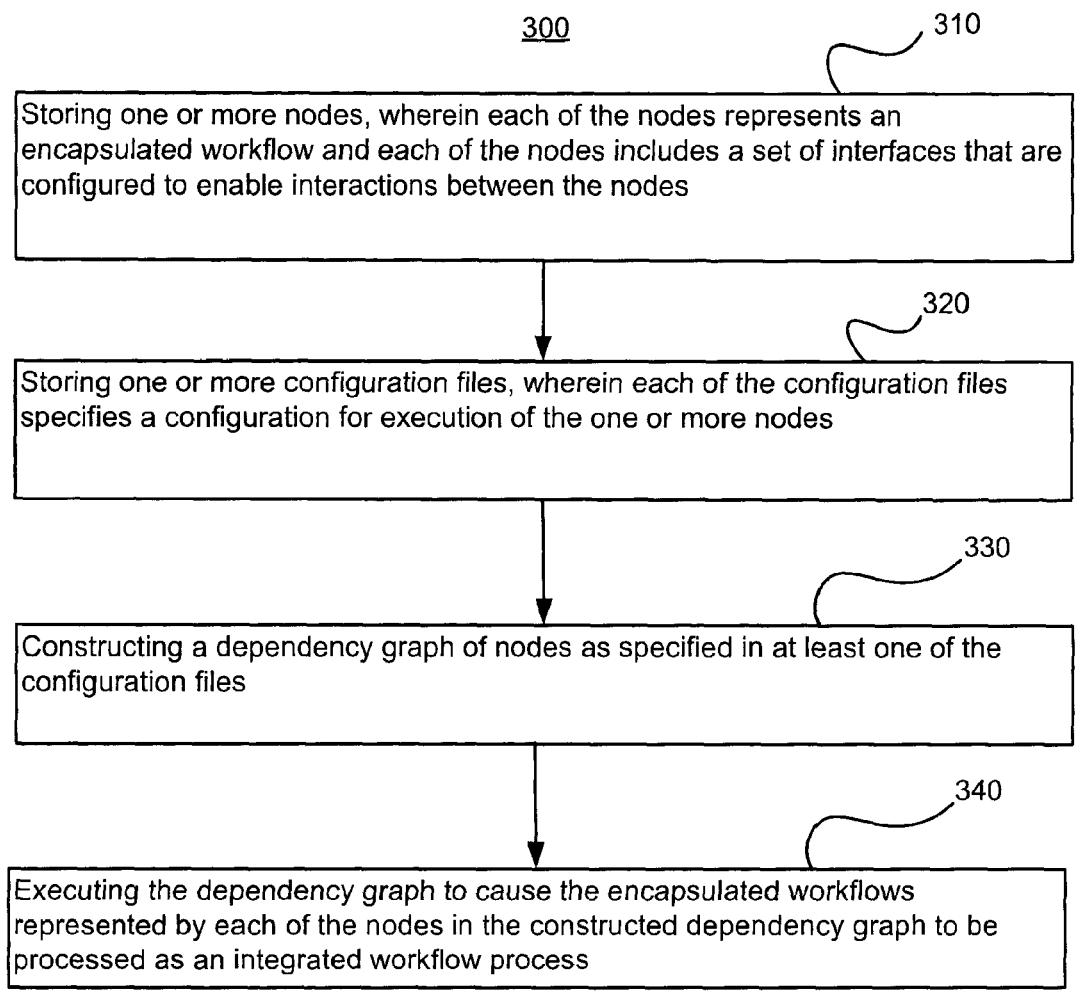
FIG. 3 is an exemplary flowchart illustrating example operations of the system of FIG. 1.

Referring to FIG. 3, an exemplary process 300 illustrates example operations of system 100 of FIG. 1. Process 300 includes storing one or more nodes, where each of the nodes represents an encapsulated workflow and each of the nodes includes a set of interfaces that are configured to enable the interactions between the nodes (310), storing one or more configuration files, where each of the configuration files specifies a configuration for execution of one or more of the nodes (320), constructing a dependency graph of nodes as specified in at least one of the configuration files (330) and executing the dependency graph to cause the encapsulated workflows represented by each of the nodes in the constructed dependency graph to be processed as an integrated workflow process (340).

For example, the nodes 104a-104c may be stored in the node repository 102, where each of the nodes may include a set of interfaces such as the interfaces 222-228 of FIG. 2. The configuration files 108a-108b may be stored in the configuration repository 106. The execution engine 110 may be configured to construct the dependency graph (330) and to execute the dependency graph (340), as discussed in more detail above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system, comprising:
a node repository that is configured and arranged to store one or more nodes, wherein each of the nodes represents an encapsulated workflow and each of the nodes includes a set of interfaces that are configured to enable interactions between the nodes, wherein the encapsulated workflow comprises one or more actions that define a single resource and the set of interfaces comprises:
an import interface that is arranged and configured to receive runtime data from other nodes, and
an export interface that is arranged and configured to provide runtime data to other nodes;
a configuration repository that is configured and arranged to store one or more configuration files, wherein each of the configuration files specifies a configuration for execution of one or more of the nodes including an execution order for the nodes; and
an execution engine that is arranged and configured to construct a dependency graph of one or more levels of nodes as specified in at least one of the configuration files and to execute the dependency graph in response to one or more trigger events in an automated manner using the execution order for the nodes at each level of the dependency graph.

2. The system of claim 1 wherein the encapsulated workflow comprises a group of resources that define a single service.

3. The system of claim 2 wherein the encapsulated workflow comprises a group of services that define a single workflow.

4. The system of claim 1 wherein the set of interfaces further includes:
a configuration interface that is arranged and configured to enable inter-level communications; and
an authorization interface that is arranged and configured to verify user permissions for interaction with the node.

5. The system of claim 1 wherein:
each of the nodes defines a self-contained sub-graph of a dependency graph of a portion of a process for moving an online service from a first cluster to a second cluster, wherein the nodes are defined by one or more different teams and include processes and related dependencies for setup of the online service at the second cluster and teardown of the online service at the first cluster;
at least one of the configuration files includes a service definition for the process and defines an execution order of the nodes at each level for the process for moving the online service from the first cluster to the second cluster; and
the execution engine is arranged and configured to construct the dependency graph for the process for moving the online service from the first cluster to the second cluster and to execute the dependency graph.

6. The system of claim 5 wherein the execution engine is arranged and configured to automatically trigger the process for moving the online service from the first cluster to the second cluster in response to one or more external events.

7. The system of claim 5 wherein each of the nodes are independently modifiable and independently reusable in other processes for moving other online services from one cluster to another cluster.

8. A method comprising:
storing one or more nodes, wherein each of the nodes represents an encapsulated workflow and each of the nodes includes a set of interfaces that are configured to enable interactions between the nodes, wherein the encapsulated workflow comprises one or more actions that define a single resource and the set of interfaces comprises:
an import interface that is arranged and configured to receive runtime data from other nodes, and
an export interface that is arranged and configured to provide runtime data to other nodes;
storing one or more configuration files, wherein each of the configuration files specifies a configuration for execution of one or more of the nodes including an execution order for the nodes;

constructing a dependency graph of one or more levels of nodes as specified in at least one of the configuration files; and executing the dependency graph to cause the encapsulated workflows represented by each of the nodes in the constructed dependency graph to be processed as an integrated workflow process in response to one or more trigger events in an automated manner using the execution order for the nodes at each level of the dependency graph.

9. The method as in claim 8 wherein the encapsulated workflow comprises a group of resources that define a single service.

10. The method as in claim 9 wherein the encapsulated workflow comprises a group of services that define a single workflow.

11. The method as in claim 8 wherein the set of interfaces includes:
   a configuration interface that is arranged and configured to enable inter-level communications; and
   an authorization interface that is arranged and configured to verify user permissions for interaction with the node.

12. The method as in claim 8 wherein:
   each of the nodes defines a self-contained sub-graph of a dependency graph of a portion of a process for moving an online service from a first cluster to a second cluster, wherein the nodes are defined by one or more different teams and include processes and related dependencies for setup of the online service at the second cluster and teardown of the online service at the first cluster;
   at least one of the configuration files includes a service definition for the process and defines an execution order of the nodes at each level for the process for moving the online service from the first cluster to the second cluster; and
   the execution engine is arranged and configured to construct the dependency graph for the process for moving the online service from the first cluster to the second cluster and to execute the dependency graph.

13. The method as in claim 12 wherein the execution engine is arranged and configured to automatically trigger the process for moving the online service from the first cluster to the second cluster in response to one or more external events.

14. The method as in claim 12 wherein each of the nodes are independently modifiable and independently reusable in other processes for moving other online services from one cluster to another cluster.

15. A computer program product for executing a workflow, the computer program product being tangibly embodied on a non-transitory computer-readable medium and including executable code that, when executed, is configured to cause a data processing apparatus to:
   store one or more nodes in a node repository, wherein each of the nodes represents an encapsulated workflow and each of the nodes includes a set of interfaces that are configured to enable interactions between the nodes, wherein the encapsulated workflow comprises one or more actions that define a single resource and the set of interfaces comprises:
      an import interface that is arranged and configured to receive runtime data from other nodes, and
      an export interface that is arranged and configured to provide runtime data to other nodes;
   store one or more configuration files in a configuration repository, wherein each of the configuration files specifies a configuration for execution of one or more of the nodes including an execution order for the nodes; and
   to cause an execution engine to construct a dependency graph of one or more levels of nodes as specified in at least one of the configuration files and to execute the dependency graph in response to one or more trigger events in an automated manner using the execution order for the nodes at each level of the dependency graph, wherein the encapsulated workflows represented by each of the nodes in the constructed dependency graph are processed as an integrated workflow process.

16. The computer program product of claim 15 wherein the set of interfaces includes:
   a configuration interface that is arranged and configured to enable inter-level communications; and
   an authorization interface that is arranged and configured to verify user permissions for interaction with the node.

17. The computer program product of claim 15 wherein:
   each of the nodes defines a self-contained sub-graph of a dependency graph of a portion of a process for moving an online service from a first cluster to a second cluster, wherein the nodes are defined by one or more different teams and include processes and related dependencies for setup of the online service at the second cluster and teardown of the online service at the first cluster;
   at least one of the configuration files includes a service definition for the process and defines an execution order of the nodes at each level for the process for moving the online service from the first cluster to the second cluster; and
   the data processing apparatus causes the execution engine to construct the dependency graph for the process for moving the online service from the first cluster to the second cluster and to execute the dependency graph.

18. The computer program product of claim 17 wherein the data processing apparatus causes the execution engine to automatically trigger the process for moving the online service from the first cluster to the second cluster in response to one or more external events.

19. The computer program product of claim 17 wherein each of the nodes are independently modifiable and independently reusable in other processes for moving other online services from one cluster to another cluster.

\* \* \* \* \*